United States Patent
Colotte et al.

(10) Patent No.: US 7,210,283 B2
(45) Date of Patent: May 1, 2007

(54) MAINTENANCE AND INHIBITION PLATE FOR A THRUST REVERSER

(75) Inventors: Baptiste Colotte, Melun (FR); Alexandre Courpied, Paris (FR); Marc Croixmarie, Auvernaux (FR); Gilles Le Gouellec, Paris (FR); Marion Michau, Thiais (FR)

(73) Assignee: Hispano Suiza, Colombes (FR)

( * ) Notice: Subject to any disclaimer, the term of this patent is extended or adjusted under 35 U.S.C. 154(b) by 785 days.

(21) Appl. No.: 10/678,178

(22) Filed: Oct. 6, 2003

(65) Prior Publication Data

US 2004/0139724 A1    Jul. 22, 2004

(30) Foreign Application Priority Data

Oct. 25, 2002    (FR) .................................. 02 13404

(51) Int. Cl.
*F02K 1/70* (2006.01)
(52) U.S. Cl. .................. 60/226.2; 60/230; 244/110 B; 239/265.33
(58) Field of Classification Search ............... 60/226.2, 60/230; 244/110 B; 239/265.19, 265.25, 239/265.33
See application file for complete search history.

(56) References Cited

U.S. PATENT DOCUMENTS

| 5,448,884 | A | * | 9/1995 | Repp | ......................... | 60/223 |
| 5,819,527 | A | * | 10/1998 | Fournier | ..................... | 60/226.2 |
| 5,826,823 | A | * | 10/1998 | Lymons et al. | ......... | 244/110 B |
| 5,960,626 | A | | 10/1999 | Baudu et al. | | |
| 6,094,908 | A | | 8/2000 | Baudu et al. | | |
| 6,343,769 | B1 | * | 2/2002 | Davies | .................... | 244/110 B |
| 6,684,623 | B2 | * | 2/2004 | Langston et al. | .......... | 60/226.2 |

FOREIGN PATENT DOCUMENTS

| EP | 0 506 277 A1 | 9/1992 |
| EP | 0 743 443 A1 | 11/1996 |
| EP | 0 801 221 A2 | 10/1997 |
| WO | WO 01/57382 A2 | 8/2001 |

* cited by examiner

*Primary Examiner*—Charles G. Freay
(74) *Attorney, Agent, or Firm*—Oblon, Spivak, McClelland, Maier & Neustadt, P.C.

(57) ABSTRACT

Each manual control unit for a moving part of a thrust reverser is associated with a maintenance plate that is pivotable between at least two positions: a first or "normal operation" position in which said plate prevents the manual control unit with which it is associated from being driven manually, while allowing it to be driven electrically; and a second or "maintenance" position in which said plate allows the manual control unit with which it is associated to be driven manually while preventing it from being driven electrically.

8 Claims, 2 Drawing Sheets

MAINTENANCE AND INHIBITION PLATE FOR A THRUST REVERSER

BACKGROUND OF THE INVENTION

The present invention relates to the general field of thrust reversers for bypass turbojets. It relates more particularly to a maintenance plate enabling the thrust reverser to be inhibited electrically and/or mechanically, in particular when performing maintenance operations thereon.

Thrust reversers fitted to bypass turbojets are well known in the field of aviation. They serve to increase airplane safety by providing a braking force during landing. Thrust reversers are generally in the form of one or more moving parts of the turbojet pod, such as sliding doors, and they are suitable for being moved under drive from a control actuator so as to deflect a fraction of the gas coming from the turbojet while operating to reverse thrust. When they are in an open position, the doors of the thrust reverser serve to redirect the flow of air in a forward direction so as to deliver reverse thrust to the airplane.

During maintenance operations, when it is necessary to check whether a part of the thrust reverser is faulty, it is known to inhibit it electrically so as to avoid untimely deployment thereof. Under such circumstances, the operator in charge of maintenance operations can control certain movements of the doors of the thrust reverser manually by means of an actuator drive takeoff enabling the doors to be driven manually. Unfortunately, such operations are not without risk for the operator. Numerous accidents have been observed, often due to the fact that the thrust reverser continues to be active during such operations. To ensure the safety of the maintenance operator, it is therefore necessary to avoid any risk of the reverser doors being driven in untimely manner. Similarly, it can also be necessary to lock the thrust reverser mechanically, e.g. as a result of a pilot decision prior to airplane takeoff. Such mechanical locking or inhibition of the thrust reverser is obtained in awkward manner, generally by screwing the doors of the thrust reverser directly to the pod of the turbojet.

OBJECT AND SUMMARY OF THE INVENTION

The present invention thus seeks to mitigate such a drawback by proposing a thrust reverser for a turbojet that is fitted with means enabling the thrust reverser to be inhibited electrically and/or mechanically, in particular while maintenance operations are being performed thereon.

To this end, the invention provides a thrust reverser for a bypass turbojet, the thrust reverser comprising: at least one moving part suitable for being displaced under drive from at least one control actuator so as to constitute an obstacle for diverting flow when operating to reverse thrust; at least one manual control unit including a drive takeoff enabling the moving part associated with the control actuator to be driven manually; and an electrical control system for driving the control actuator electrically; wherein each manual control unit is associated with a maintenance plate that is pivotable between at least two positions:

a first or "normal operation" position in which the plate prevents the manual control unit with which it is associated from being driven manually, while allowing it to be driven electrically; and a second or "maintenance" position in which the plate allows the manual control unit with which it is associated to be driven manually, while preventing it from being driven electrically.

As a result, the presence of maintenance plates makes it possible to avoid any untimely deployment of the thrust reverser while performing maintenance operations thereon. When one of the maintenance plates is moved into the maintenance position by an operator, the thrust reverser is automatically inhibited electrically. This electrical inhibition also has the advantage of protecting the maintenance operator from any risk of electrocution.

Advantageously, each maintenance plate is pivotable into a third or "locking" position different from the first and second positions, in which the plate prevents the manual control unit with which it is associated from being driven manually while also preventing it from being driven electrically. When one of the maintenance plates is moved into the locking position, the reverser is inhibited both electrically and mechanically. The maintenance plates thus perform two inhibit functions (electrical and mechanical).

Preferably, the thrust reverser further includes detector means for detecting the positions of the maintenance plates connected to the electrical control system, the detector means allowing electrical drive of the reverser to be inhibited whenever any one of the maintenance plates is in the maintenance position or the locking position.

Each maintenance plate may include a latch for co-operating with the drive takeoff of the manual control unit with which it is associated when the plate is in the locking position, thereby locking the moving portion in position. The latch may be square or hexagonal and shaped to engage in the drive takeoff when the plate is in the locking position.

Advantageously, each maintenance plate is disposed in a plane substantially perpendicular to an axis of the drive takeoff of the manual control unit with which it is associated, and is pivotable about a pivot axis substantially parallel to the takeoff axis. In addition, the maintenance plates may be substantially rectangular or substantially L-shaped.

BRIEF DESCRIPTION OF THE DRAWINGS

Other characteristics and advantages of the present invention appear from the following description made with reference to the accompanying drawings which show an embodiment having no limiting character. In the figures.

DETAILED DESCRIPTION OF AN EMBODIMENT

Figure 1:
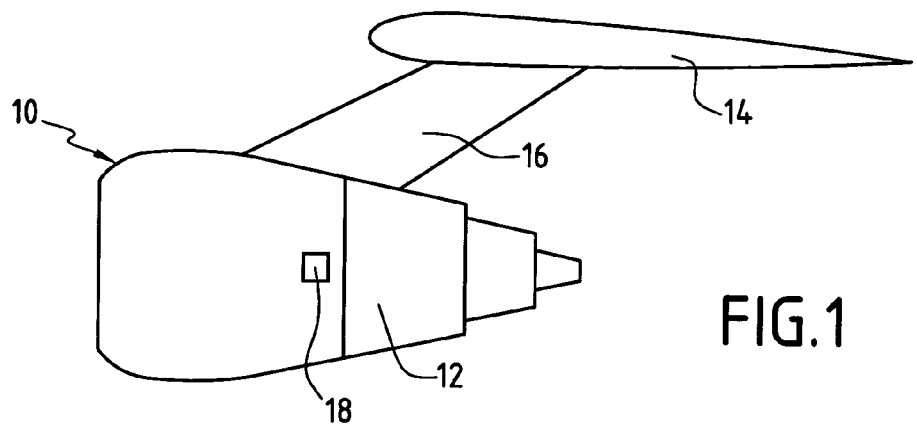
FIG. 1 is a diagrammatic perspective view of a turbojet pod including a thrust reverser with sliding doors, the reverser being in the closed position.
Figure 2:
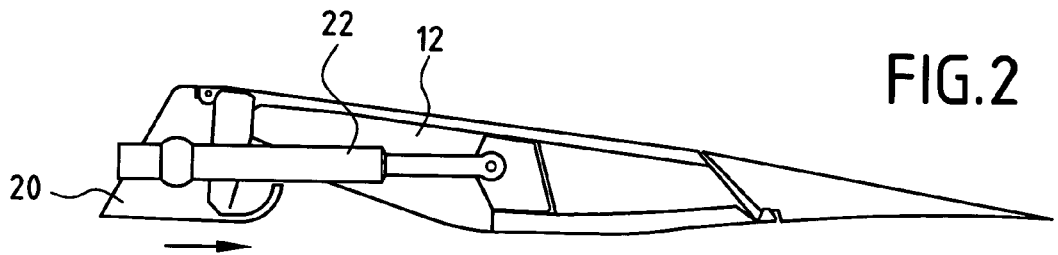
FIG. 2 is a fragmentary longitudinal section view of the FIG. 1 thrust reverser.

Reference is made initially to FIGS. 1 and 2 which are diagrams of a bypass turbojet pod 10 including a grid thrust reverser. In this case, the thrust reverser is constituted by a moving part 12 which, in its inactive or closed position, constitutes a portion of the outer casing of the pod 10. The turbojet is supported beneath a wing 14 of the airplane by means of a pylon 16. The moving portion of the pod 12 is mounted to slide on a portion of the outer casing. An access hatch 18 can be included in the outer casing of the pod in order to facilitate maintenance of the reverser. The upstream portion of the outer casing includes a front frame 20 which serves as a support for means concerning the displacements of the moving portion 12 of the pod, e.g. means constituted by actuators 22.

Figure 3:
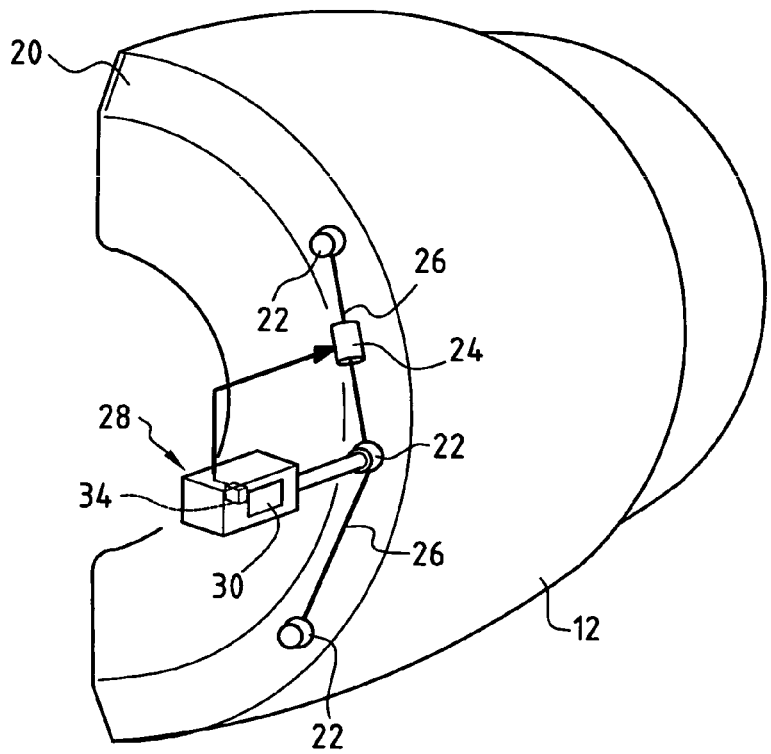
FIG. 3 is a fragmentary cross-section view of the FIG. 1 thrust reverser.

As shown in FIG. 3, the control actuators 22 are also connected to an electrical control system 24 of conventional type. By way of example, the control system may comprise an electric motor and an electronic power control system. Naturally, the invention also applies to thrust reversers of hydraulic or pneumatic type. The control system may be connected to a full authority digital engine control (FADEC) unit. In the example shown in FIG. 3, a single actuator control system is used for controlling displacement of the moving portion 12 of the pod. In this case, flexible transmission shafts 26 of known type connect the control actuators 22 to the control system.

The reverser also comprises at least one manual control unit 28 enabling a maintenance operator to cause the moving portion 12 of the pod to slide manually by using a handle. The manual control unit 28 (only one is shown in FIG. 3) is fixed adjacent to one of the control actuators 22 to which it is permanently connected mechanically. For this purpose, each manual control unit includes a drive takeoff 28a (FIGS. 4A to 4C and 5A to 5C) enabling the maintenance operator to drive both the actuator on which it is fixed and the other control actuators via the transmission shafts 26. As a result, the maintenance operator can actuate the thrust reverser manually.

In the invention, each manual control unit 28 is associated with a maintenance plate 30. The disposition of the maintenance plate depends on the configuration of the manual control unit which may include an angle takeoff. In FIG. 3, the maintenance plates are disposed in a plane substantially parallel to the axis of the control actuator with which the manual control unit is associated and they are pivotable about corresponding pivot axes 32 that are substantially perpendicular to the actuator axis. In addition, each maintenance plate 30 can be moved by the maintenance operator between at least two positions:

a first or "normal operation" position in which the maintenance plate 30 masks access to the takeoff 28a of the manual control unit with which it is associated, thus preventing the moving portion 12 of the pod being driven manually and thus preventing the thrust reverser from being driven manually, while nevertheless allowing it to be driven electrically; and a second or "maintenance" position which is obtained by pivoting the plate about the pivot axis 32, in which position access to the takeoff 28a of the manual control unit is released, thus allowing the moving portion 12 of the pod and thus the thrust reverser to be driven manually while preventing it from being driven electrically. The moving portion of the pod is pivoted manually in conventional manner by using a handle having an endpiece that co-operates with the takeoff of the manual control unit.

In addition, the thrust reverser of the invention includes detector means 34 for detecting the positions of each of the maintenance plates 30. These detector means 34 associated with each maintenance plate are connected to the electrical control system 24 and enable electrical control of the reverser to be inhibited when any one of the maintenance plates is moved into its maintenance position. To do this, the detector means may be implemented, for example, in the form of proximity detectors of conventional type (e.g. optical, magnetic, or indeed of the type including a mechanical contactor). Under such circumstances, when any one of the maintenance plates 30 is moved into the maintenance position, the proximity detector associated with said plate no longer detects the presence of the plate and allows the reverser to be cut off electrically by means of the control system 24.

Advantageously, each maintenance plate 30 can be pivoted into a third or "locking" position which is different from the normal operation and the maintenance positions, and in which the plate prevents the thrust reverser being driven manually while also preventing it from being driven electrically.

To do this, when the maintenance plate is in the locking position, the detector means 34 also act to inhibit the reverser being driven electrically. In order to prevent the moving portion 12 of the pod and thus the thrust reverser from being driven manually, the maintenance plate presents a latch (36 in FIGS. 4C and 5C) for co-operating with the takeoff 28a of the manual control unit 28 when the plate is in the locking position so as to lock the moving portion 12 of the pod actuated by the control actuators 12. The latch 36 may be square or hexagonal (depending on the shape of the takeoff) and suitable for being received in the takeoff 28a of the manual control unit. Under such circumstances, the square or hexagonal latch lies on the axis 38 of the takeoff 28a of the manual control unit when the plate is pivoted into its locking position.

Figure 4A:
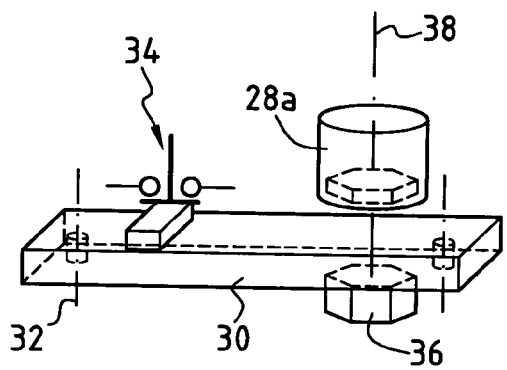
FIGS. 4A to 4C are diagrams showing a maintenance plate fitted to a thrust reverser in one embodiment of the invention, shown in three different positions.
Figure 4B:
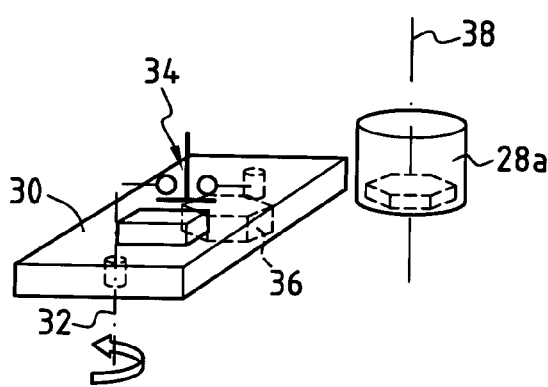
Figure 4C:
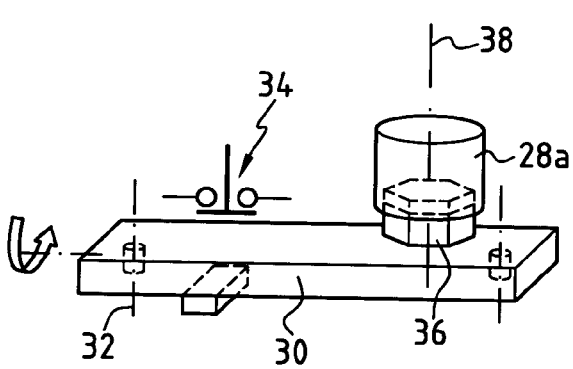

Reference is now made to FIGS. 4A to 4C which show an embodiment of a maintenance plate of the invention. In these figures, the maintenance plate 30 is substantially rectangular in shape.

FIG. 4A shows a maintenance plate in its "normal operation" position. In this position, one end of the plate masks access to the takeoff 28a of the manual control unit 28, thus preventing the thrust reverser from being driven manually. The detector means 34 inform the electrical control system 24 that the maintenance plate is in its normal operation position. The electrical control system can thus allow the thrust reverser to be driven electrically. The plate is held in this normal operation position, e.g. by means of bolts (not shown).

In FIG. 4B, the maintenance plate has been pivoted manually by the maintenance operator (through about 90° in the figure) away from its normal operation position. The plate is thus in its maintenance position. The detector means 34 no longer detect the presence of the plate and thus cause electrical drive of the thrust reverser to be inhibited. The maintenance operator has direct access to the takeoff 28a of the manual control unit 28 without any risk of the reverser being deployed in untimely manner and without any risk of electrocution.

Finally, as shown in FIG. 4C, the maintenance plate may be suitable for pivoting into a position for locking the thrust reverser. To do this, the maintenance operator turns the plate 30 upside-down relative to its normal operation position so that its latch 36 which lies on the axis 38 of the takeoff 28a is received in the takeoff of the manual control unit, thus locking it mechanically. In addition, the detector means 34 no longer detect the presence of the plate 30 and therefore cause electrical drive of the thrust reverser to be inhibited. The reverser can thus no longer be operated whether mechanically or electrically. The pilot may require such total inhibition of the thrust reverser, for example prior to takeoff of the airplane. It may also be used during maintenance of the reverser: the operator begins by inhibiting electrical drive of the reverser by placing the maintenance plates in the maintenance position so as to be able to place the reverser in some desired position. Thereafter the operator inhibits mechanical drive of the reverser prior to undertaking maintenance operations proper. This solution has the advantage of providing greater safety for the maintenance operator.

Figure 5A:
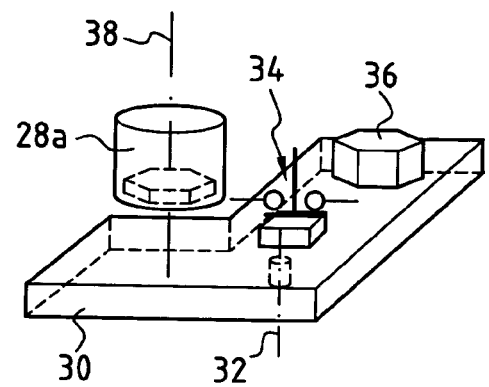
FIGS. 5A to 5C are diagrams showing a maintenance plate fitted to a first reverser in another embodiment of the invention, likewise shown in three different positions.
Figure 5B:
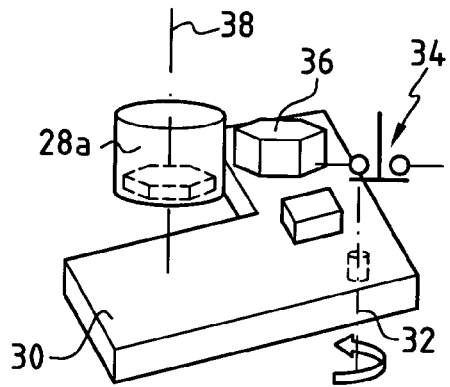
Figure 5C:
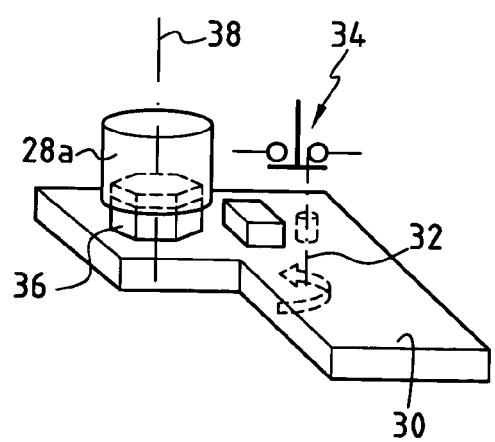

FIGS. 5A to 5C show another embodiment of a maintenance plate of the invention. In these figures, the maintenance plate 30 is L-shaped.

In FIG. 5A, the maintenance plate is in its "normal operation" position. One end of the plate masks access to the takeoff 28a of the manual control unit, thus preventing the thrust reverser being driven manually while allowing it to be driven electrically. In FIG. 5B, the maintenance plate has been pivoted manually by the maintenance operator (through about 45° in the figure) away from its normal operation position. The plate is thus in a maintenance position and access to the takeoff 28a of the manual control unit is disengaged. The detector means 34 no longer detect the presence of the plate and thus cause electrical drive of the thrust reverser to be inhibited. In FIG. 5C, the maintenance operator has pivoted the maintenance plate 30 through another 45° approximately away from its maintenance position. The latch 36 which is positioned on the axis 38 of the takeoff 28a is received in the takeoff of the manual control unit, thus locking it mechanically. The detector means 34 continue not detecting the presence of the plate 30, and therefore continue to cause electrical control of the thrust reverser to be inhibited.

The examples shown are applied to a grid thrust reverser. Nevertheless, maintenance plates can also be used on a reverser that makes use of downstream obstacles (doors or shells, for example), in association with actuators for controlling displacement of the moving parts of the reverser.

What is claimed is:

1. A thrust reverser for a bypass turbojet, the thrust reverser comprising:
   at least one moving part suitable for being displaced under drive from at least one control actuator so as to constitute an obstacle for diverting flow when operating to reverse thrust;
   at least one manual control unit including a drive takeoff enabling said moving part associated with said control actuator to be driven manually; and
   an electrical control system for driving said control actuator electrically;
   wherein each manual control unit is associated with a maintenance plate that is pivotable between at least two positions:
   a first or "normal operation" position in which said plate prevents the manual control unit with which it is associated from being driven manually, while allowing it to be driven electrically; and
   a second or "maintenance" position in which said plate allows the manual control unit with which it is associated to be driven manually, while preventing it from being driven electrically.

2. A thrust reverser according to claim 1, wherein each maintenance plate is pivotable into a third or "locking" position different from said first and second positions, in which said plate prevents the manual control unit with which it is associated from being driven manually while also preventing it from being driven electrically.

3. A thrust reverser according to claim 2, further including detector means for detecting the positions of said maintenance plates connected to said electrical control system, said detector means allowing electrical drive of said reverser to be inhibited whenever any one of the maintenance plates is in the maintenance position or the locking position.

4. A thrust reverser according to claim 2, wherein each maintenance plate includes a latch for co-operating with said takeoff of the manual control unit with which it is associated when said plate is in said locking position, thereby locking the moving portion in position.

5. A reverser according to claim 4, wherein said latch is square or hexagonal and shaped to be received in said takeoff when said plate is in said locking position.

6. A thrust reverser according to claim 1, wherein each maintenance plate is disposed in a plane substantially perpendicular to an axis of the takeoff of the manual control unit with which it is associated, and is pivotable about a pivot axis substantially parallel to said takeoff axis.

7. A thrust reverser according to claim 6, wherein said maintenance plate is substantially rectangular.

8. A thrust reverser according to claim 6, wherein said maintenance plate is substantially L-shaped.

* * * * *